(12) United States Patent
Noda et al.

(10) Patent No.: US 6,529,468 B2
(45) Date of Patent: Mar. 4, 2003

(54) OPTICAL DISK DRIVING DEVICE HAVING A CLAMPER FOR CORRECTING WARPAGE OF AN OPTICAL DISK

(75) Inventors: Yosuke Noda, Osaka (JP); Yuji Ariyoshi, Osaka (JP); Katsuhiko Koshino, Osaka (JP); Kiyoshi Ishioka, Osaka (JP); Masanori Onishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 39 days.

(21) Appl. No.: 09/735,463

(22) Filed: Dec. 14, 2000

(65) Prior Publication Data

US 2001/0004342 A1 Jun. 21, 2001

(30) Foreign Application Priority Data

Dec. 17, 1999 (JP) ............................................. 11-359249
Apr. 27, 2000 (JP) ........................................ 2000-127447

(51) Int. Cl.$^7$ ................................................. G11B 23/00
(52) U.S. Cl. ...................... 369/263; 369/271; 369/53.41
(58) Field of Search ................................. 369/258, 261, 369/263, 264, 270, 271, 53.12, 53.13, 53.14, 53.2, 53.23, 53.41, 53.42

(56) References Cited

U.S. PATENT DOCUMENTS 4,577,307 A * 3/1986 Woods et al. ................ 369/270

* cited by examiner

Primary Examiner—Paul W. Huber
(74) Attorney, Agent, or Firm—Wenderoth, Lind & Ponack, L.L.P.

(57) ABSTRACT

For providing an optical disk driving device that is capable of accurately performing recording and reproduction of even disks that include warpage without the provision of a tilt mechanism, a clamper is comprised of a central clamper portion for pinching and holding a disk between the clamper and a turntable, and an outer clamper portion for abutting against an outer periphery of the disk and pressurizing the same in case the disk includes any warpage to thereby correct the warpage. It is accordingly possible to restrict an angle formed between a light beam and an information surface of the disk to be within a specified value for accurately performing reproduction.

13 Claims, 14 Drawing Sheets

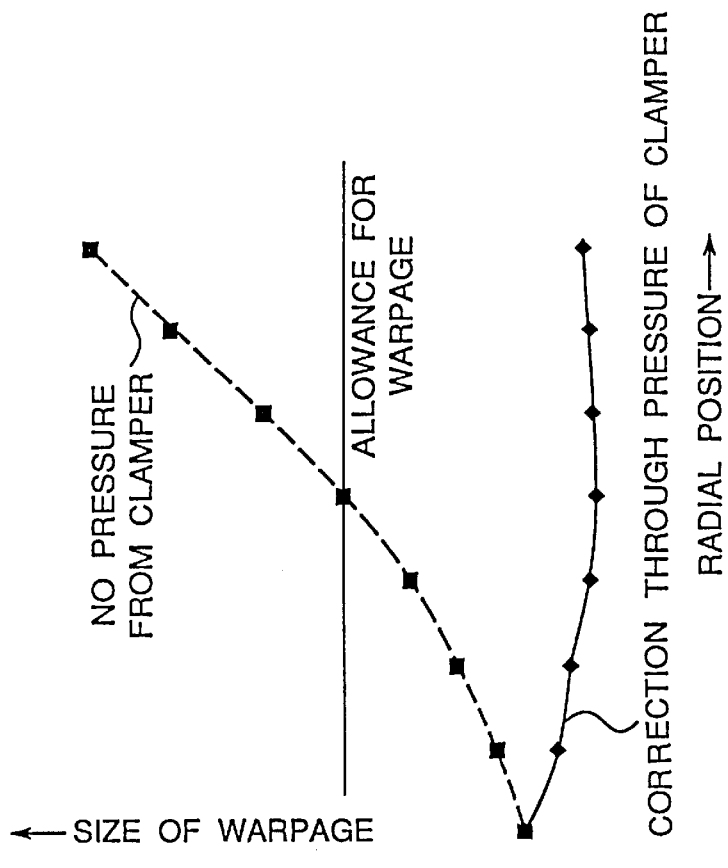
Fig.3B LARGE CLAMPER PORTION (OUTER PERIPHERAL SIDE) PROJECTING
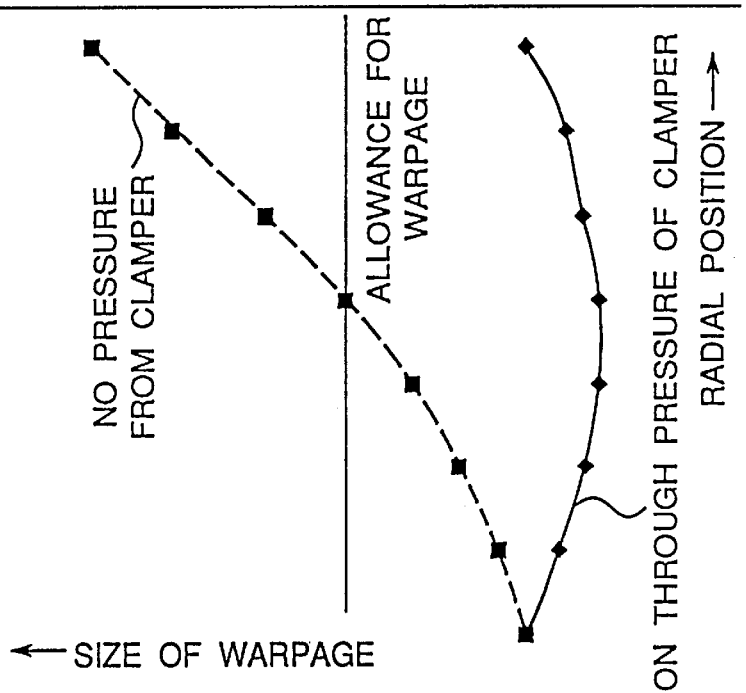
Fig.3A SUBSTANTIALLY SAME HEIGHT

OPTICAL DISK DRIVING DEVICE HAVING A CLAMPER FOR CORRECTING WARPAGE OF AN OPTICAL DISK

BACKGROUND OF THE INVENTION

1. Field of the Invention

The present invention relates to an optical disk driving device for holding and rotating disk-like recording media such as optical disks (CDs, DVDs etc.) or optical magnetic disks (hereinafter simply referred to as "disks") and for irradiating light beams for recording or reproducing information.

2. Description of the Background Art

Disks such as CDs or DVDs are being paid attention to as information recording media in recent years, and many such disks are being developed to be of high density and large capacity and are produced all over the world since they may be produced at low costs. There are further being suggested various optical disk driving devices for rotating such disks for the purpose of recording or reproducing information.

A conventional optical disk driving device will now be explained.

FIG. 14 is a schematic view illustrating an arrangement of a conventional optical disk driving device. In FIG. 14, a disk 109 is fixed in a known manner in that its central proximate portion 109a is mounted on a turntable 101 and in that the disk is pinched between the turntable 101 and a clamper 102 that is of substantially identical diameter as that of the turntable 101. Some of the major methods for pinching and fixing the disk between the turntable 101 and the clamper 102 will be explained.

In one possible method, the clamper 102 is arranged at a disk lid of a box-shaped portable device in a freely rotating manner such as in so-called portable CD devices wherein the clamper 102 is moved and pressurized against the turntable 101 by closing the disk lid to fix (or hold) the disk.

In another method, which is mainly used in stationary devices of so-called tray systems, a disk 109 that is moved onto the turntable 101 by a tray is lifted from the tray by the movement of the turntable 101 and is pressurized against a freely rotating clamper 102 to fix the disk 109.

In still another method, of a so-called slot-in system as frequently used in CD players for use in car stereos or the like, a disk that has been inserted into a slot (slot of narrow width) by a user in a known manner is moved onto the turntable 101 by a rubber-like roller or similar means and the disk 109 is pinched and held by the movement of the turntable 101 or a freely rotating clamper 102.

As well known, a tapered portion (not shown) is provided on a surface of the turntable 101 on which the disk is mounted as a means for centering the disk so that inner peripheral end portions of the disk 109 may be pinched and held in the centered position.

Major means for pinching and holding are those employing magnetic force of a magnet. A magnet is mounted to either of the clamper or the turntable and the other member is mounted with sheet metal. Fixing is achieved through a mutually pinching and holding force in the presence of such magnetic force of the magnet. It goes without saying that both members may be comprised of magnets to achieve the same effects. However, since such an arrangement will increase manufacturing costs, it is generally the case that either one is formed with sheet metal.

In the above-described optical disk driving device in which the disk 109 is pinched and held between the turntable 101 and the clamper 102, the disk 109 is rotated simultaneously with the rotation of the turntable 101, and light beam L is irradiated from a pickup 103 that moves in a radial direction of the disk 109 (direction indicated by arrow R in the drawing). By the irradiation of the light beam L, information may be recorded on the disk 109 or information that has been recorded on the disk may be reproduced upon reflection by the disk 109.

In order to perform high-density recording or reproduction of information, it is necessary to accurately irradiate the light beam onto the disk 109 and the reflected light beam needs to be accurately received. It is thus necessary to strictly define focus control of the light beam for achieving focus of the light beam on the surface of the disk (more particularly, on an information surface on an inner surface of the disk) and angles between the disk surface and the light beam.

To cope with this matter, a conventional optical disk driving device is arranged to perform the above-described focus control and to perform so-called tilt control for tilting the pickup 103 for irradiating the light beam in a manner as indicated by the arrow C in the drawing for setting the angle between the disk surface and the light beam to be within a defined value so as to also enable recording and reproduction of warped, flexed or deflected disks as illustrated in the schematic side view of FIG. 15.

It is further generally the case with such a conventional optical disk device that the optical disk is first mounted onto a disk tray (hereinafter simply referred to as "tray") through operations of a user, whereupon the optical disk is moved together with the tray to be retracted into the interior of the device. At this time, the clamper, which has a substantially identical radius as a radius of the turntable, is supported by a clamp plate that is fixed to bridge over the turntable and is suspended down through its own weight, and the tray had so far been designed to avoid interference with the clamper during its movement.

However, in order to precisely irradiate a light beam onto tracks of the disk and to make the light beam follow the tracks, it is required in the above-described conventional optical disk driving device that the pickup for irradiating light beam be comprised with a mechanism for accurately moving the same in the radial direction of the disk and further with a tilt mechanism for tilting the pickup to follow the warpage of the disk. A drawback was consequently presented in that the mechanism of the conventional optical disk driving device was complicated and downsizing thereof could hardly be achieved. It was another drawback that movements of the tray were hindered by a large clamper when the large clamper for pressurizing an outer peripheral portion of the disk was mounted on the conventional optical disk device.

SUMMARY OF THE INVENTION

The present invention has been made in order to solve the above conventional problems, and it is an object thereof to provide an optical disk driving device that is capable of accurately performing recording and reproduction also with warped disks without the provision of a tilt mechanism and that is provided with a moving means for the clamper such that movements of the tray are not hindered.

In order to achieve this object, the disk-like recording medium driving device of the present invention is arranged in that a clamper (or a turntable) for pinching and holding the disk-like recording medium is comprised of a central clamper (or a central turntable portion) for pinching and holding a proximity of an inner edge of the disk-like recording medium with the turntable (or the clamper) and an outer clamper portion (or an outer turntable portion) abutting against an outer periphery of the disk-like recording medium.

With this arrangement, it is possible to obtain a disk-like recording medium driving device that is arranged to abut and pressurize a proximity of an outer periphery of the warped disk at which no information is recorded, to thereby correct the warpage, to restrict an angle between an information recording surface of the disk and the light beam that is irradiated for recording and reproducing information to be within a specified value, and to precisely read information for accurately performing recording and reproduction.

The present invention is directed to an optical disk driving device for pinching and holding an optical disk that is mounted on a rotationally driving turntable with a clamper that is supported in a freely rotating manner, wherein the clamper of the disk-like recording medium driving device is comprised of a central clamper portion for pinching and holding a proximity of an inner edge of the optical disk with the turntable and an outer clamper portion abutting against an outer periphery of the optical disk.

With this arrangement, by abutting and pressurizing a proximity of an outer periphery of a disk, which is warped toward the clamper side, on which no information is recorded, it is possible to exhibit effects of correcting the warpage, of restricting an angle between an information recording surface of the disk and the light beam that is irradiated for recording and reproducing information to be within a specified value, and of precisely reading information for accurately performing recording and reproduction.

The device further comprises a pressurizing unit for pressurizing the clamper against the turntable, a surface deflection amount detecting unit for detecting an amount of surface deflection of the mounted optical disk, and a control unit for sending instructions to the pressurizing unit to increase pressurizing force depending on the detected results of the amount of surface deflection obtained by the surface deflection amount detecting unit.

With this arrangement, in case the amount of surface deflection is larger than a defined value, the pressurizing force is increased by the pressurizing unit to perform correction so that stable reproduction can be achieved even with largely warped disks.

The turntable is preferably comprised of a central turntable portion for pinching and holding a proximity of an inner edge of the disk-like recording medium with the clamper, and an outer turntable portion abutting against an outer periphery of the disk-like recording medium.

With this arrangement, by abutting and pressurizing a periphery of an outer periphery of a disk, which is warped toward the turntable side, at which no information is recorded, it is possible to exhibit the effects of correcting the warpage, of restricting an angle between an information recording surface of the disk and the light beam that is irradiated for recording and reproducing information to be within a specified value, and of precisely reading information for accurately performing recording and reproduction.

The device is particularly characterized in that the turntable is comprised with spokes for supporting the outer turntable portion from the central turntable portion, and it is therefore possible to exhibit the effect of preventing a case in which the light beam for reading optical information on the disk is not at all irradiated onto the disk and that optical information may also be partially read.

The device has particularly been devised to further comprise a pickup for irradiating light beams onto the optical disk, a pickup controlling unit for controlling the pickup, a turntable rotating mechanism for controlling rotation of the turntable and outputting a rotational position signal for indicating a position of rotation, and a control unit for sending instructions to the pickup controlling unit to interrupt focus control of the pickup depending on a rotational phase upon input of the rotational position signal of the turntable, wherein the turntable is comprised with spokes for supporting the outer turntable portion from the central turntable portion.

With this arrangement, it is possible to eliminate influences of interruption of the light beams through the spokes for supporting the outer turntable portion and to perform stable reproduction.

According to another aspect, the present invention relates to an optical disk driving device for pinching and holding an optical disk, which is mounted on a position that is concentric with a turntable fixed to a rotating axis of a spindle motor, with a clamper that is supported in a freely rotating manner, the clamper of the optical disk driving device being comprised of a central clamper for pinching and holding a proximity of an inner edge of the optical disk with the turntable and an outer clamper portion abutting against an outer periphery of the optical disk, wherein the device further comprises a clamper moving mechanism for moving the clamper in a direction opposite to (i.e. away from) an upper surface of the turntable unless the turntable and clamper are in pinching and holding conditions.

With this arrangement, it is possible to provide an optical disk driving device that is capable of accurately performing recording and reproduction even with warped disks without the provision of a tilt mechanism and wherein a moving mechanism for the clamper is provided such that movements of the tray are not hindered.

That is, with this arrangement, the optical disk driving device is capable of exhibiting an action of correcting warpage by abutting and pressurizing a proximity of an outer periphery of a disk-like recording medium (an optical disk) at which no information is recorded, of restricting an angle between an information recording surface of the disk and the light beam that is irradiated for recording and reproducing information to be within a specified value, and of precisely reading information for accurately performing recording and reproduction without the necessity of providing any complicated tilt mechanisms. This optical disk driving device, which is provided with an outer clamper portion, further exhibits the action of moving the outer clamper portion so as not to hinder movements of the tray.

The optical disk driving device may further have the clamper supported at a position that is concentric with the turntable, a spring member having one end abutting the clamper and the other end abutting a spring holder that is mounted at a position concentric with the clamper, a spring hook that pierces through the clamper and that is fixed to the spring holder with the clamper and the spring member being interposed between, and a clamp plate for supporting the spring hook, wherein the spring hook is supported by the clamp plate unless the turntable and the clamper are in pinching and holding conditions and wherein the clamper is moved by the spring member interposed between the clamper and the spring holder.

With this arrangement, the spring hook may be supported by the clamp plate unless the turntable and the clamper are in pinching and holding conditions, and the spring holder that is fixed to the spring hook may be simultaneously supported. It is possible to exhibit an action of having the clamper moved by the spring member that is interposed between the supported spring holder and the clamper.

The optical disk driving device may further be arranged such that the clamper has a first magnet mounted thereon, a clamp plate is disposed on a side of the clamper opposite the turntable, and a second magnet is mounted on the clamp plate, wherein the clamper is moved through mutual pulling owing to magnetic force of the first magnet and the second magnet unless the turntable and the clamper are in pinching and holding conditions.

With this arrangement, it is possible to exhibit an action of moving the clamper through mutual pulling owing to magnetic force of the first magnet and the second magnet unless the turntable and the clamper are in pinching and holding conditions.

BRIEF EXPLANATION OF THE DRAWINGS

FIGS. 3A and 3B are views for explaining results of correction of warpage in a disk in the above device.

DETAILED DESCRIPTION OF THE INVENTION

Embodiments of the present invention will now be explained with reference to FIGS. 1A to 13C.

Embodiment 1

Figure 1A:
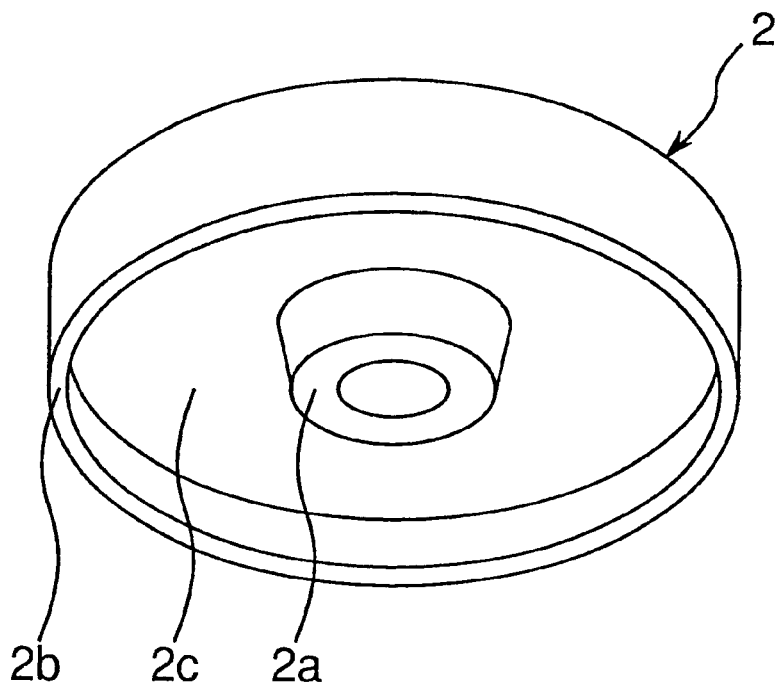
FIGS. 1A and 1B are schematic views of an arrangement of an optical disk driving device according to Embodiment 1 of the present invention.
Figure 1B:
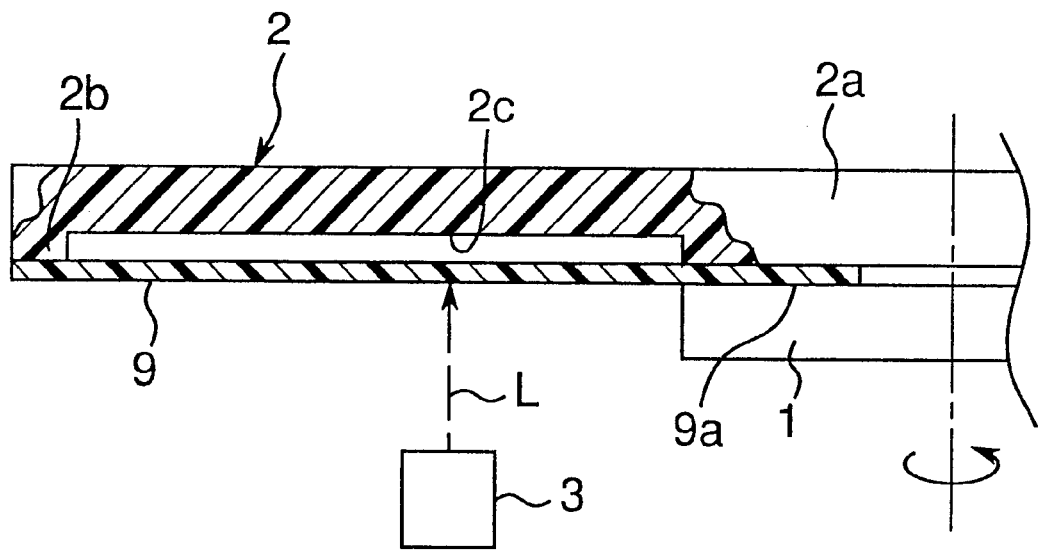

FIGS. 1A and 1B are schematic views of an arrangement of an optical disk driving device according to Embodiment 1 of the present invention, wherein FIG. 1A is a perspective view of an arrangement of a clamper (to be described later) and FIG. 1B is a partial sectional side view thereof. FIGS. 1A–2C denote a clamper that is comprised of a central clamper portion 2a for pinching a proximity of an inner edge of a disk 9 with a turntable 1 for fixing the same and an outer clamper portion 2b that is of substantially identical radius as that of a proximity of an outer edge 9b of the disk 9 and that is of substantially identical height as that of the central clamper portion 2a, both members extending over the entire periphery. A concave portion 2c is formed to extend over the entire periphery between the central clamper portion 2a and the outer clamper portion 2b of the clamper 2 so as not to contact the disk 9. Other members, namely the turntable 1 for rotating the disk 9 through its own rotation and a pickup 3 for irradiating a light beam L onto the disk 9 are similar to those of the prior art.

Operations of the thus arranged optical disk driving device will now be explained with reference to FIGS. 2A–2C that illustrates schematic side and sectional views (wherein hatchings for indicating sections are partially omitted). Similar to a conventional device, the disk 9 is mounted onto the turntable 1 and the clamper 2 is attached thereafter. At this time, the central clamper portion 2a of the clamper 2 pinches the proximity of the inner edge 9a of the disk 9 with the turntable 1 for fixing the same, and the outer clamper portion 2b contacts the outer edge of the disk 9.

Figure 2A:
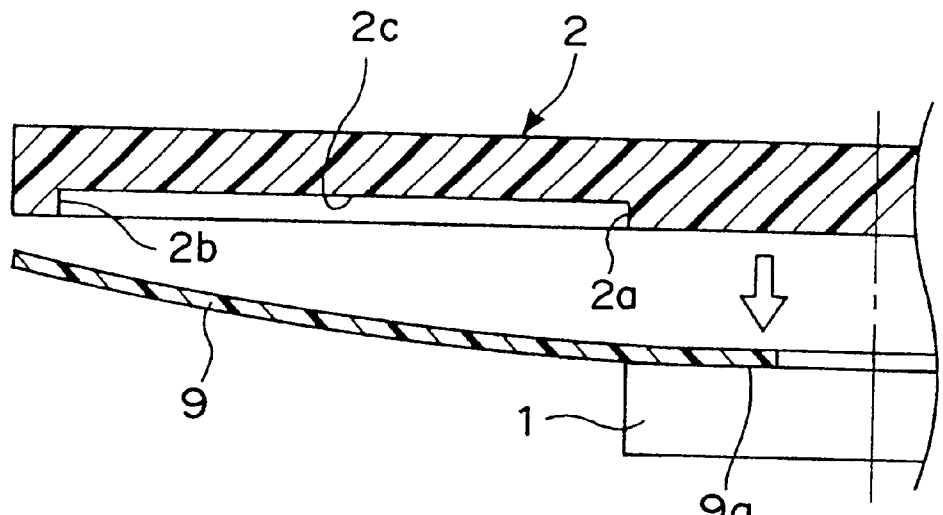
FIGS. 2A–2C are schematic side and sectional views for explaining operations of the above device.
Figure 2B:
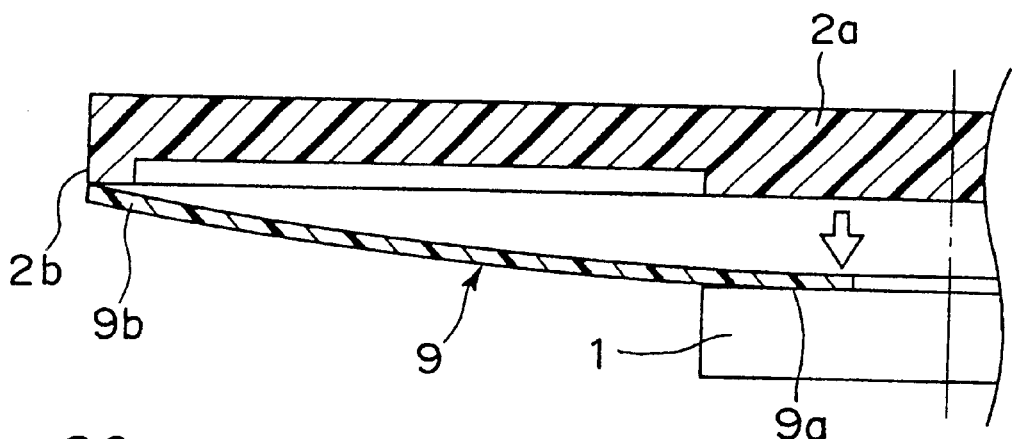
Figure 2C:
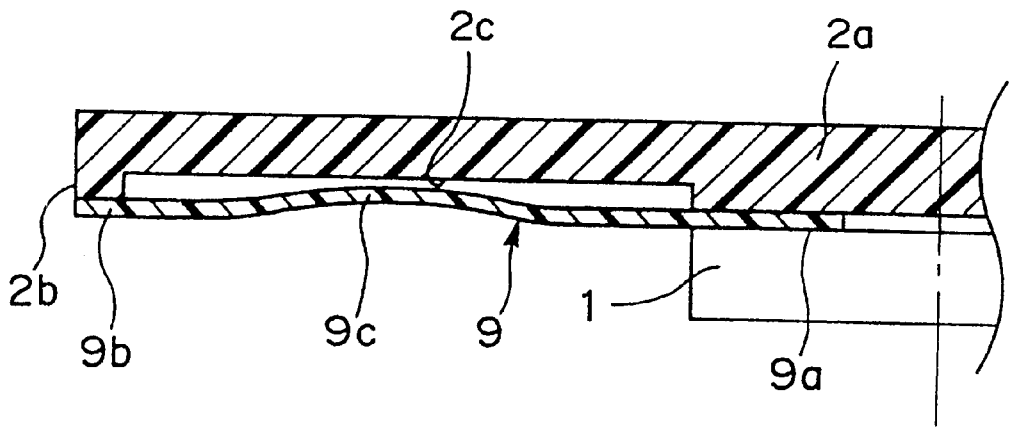

As illustrated in FIG. 2, in case the outer edge side of the disk 9 is warped towards a direction opposite to a surface onto which the light beam is irradiated (in a direction of a so-called labeled surface) (see FIG. 2A), the disk 9 is first made to abut against the outer clamper portion 2b of the clamper 2 at the outer peripheral portion thereof, whereupon the disk 9 is pressurized by the central clamper portion 2a for pinching and fixing the same with the turntable 1 as illustrated in FIG. 2B. With this pinching and holding, the warped outer edge portion 9b of the disk 9 is pressurized in a direction opposite to the original warpage so that the warpage is corrected. While it may be that a central radial portion of the disk 9c (that is, a portion between the proximity of the inner edge portion 9a and the proximity of the outer edge portion 9b) remains warped in the direction of the original warpage as illustrated in FIG. 2C, it will be the concave portion 2c of the clamper 2 that opposes the central radial portion 9c so that the disk 9 will be prevented from contacting the concave portion 2c of the clamper portion 2.

In this manner, even if a warpage in the direction of the labeled surface is present in the disk 9, the warpage may be reduced by attaching the clamper 2 that is comprised with the outer clamper portion 2b so that an angle formed between the light beam of the pickup 3 and the disk surface will fall within the above-described defined value, and accurate recording and reproduction can be performed also with a pickup that is not comprised with a tilt mechanism.

We have conducted tests for the illustrated embodiment to verify effects thereof. The test results are shown in FIGS. 3A and 3B. FIG. 3A illustrates characteristics of warpage of the disk when the height positions of the central clamper portion and the outer clamper portion are substantially identical, and FIG. 3B illustrates characteristics of warpage of the disk when the outer clamper portion projects higher than the central clamper portion, wherein the lateral axis illustrates a radial directional distance from a center of the disk and the longitudinal axis represents a degree of the warpage. While it is obvious from both drawings that warpage has been corrected to be within the range of the defined value for the warpage in contrast to conditions in which no pressurizing force is applied by the outer clamper portion as illustrated by the chain lines, it can be understood that the warpage is smaller in the case of FIG. 3B in which the outer clamper portion projects further than the central clamper portion.

As explained so far, according to the present embodiment, it is possible to reduce the warpage of a disk and to perform stable reproduction and driving by providing a clamper for pressurizing an outer periphery of the disk from a labeled surface side thereof.

Embodiment 2

Figure 4:
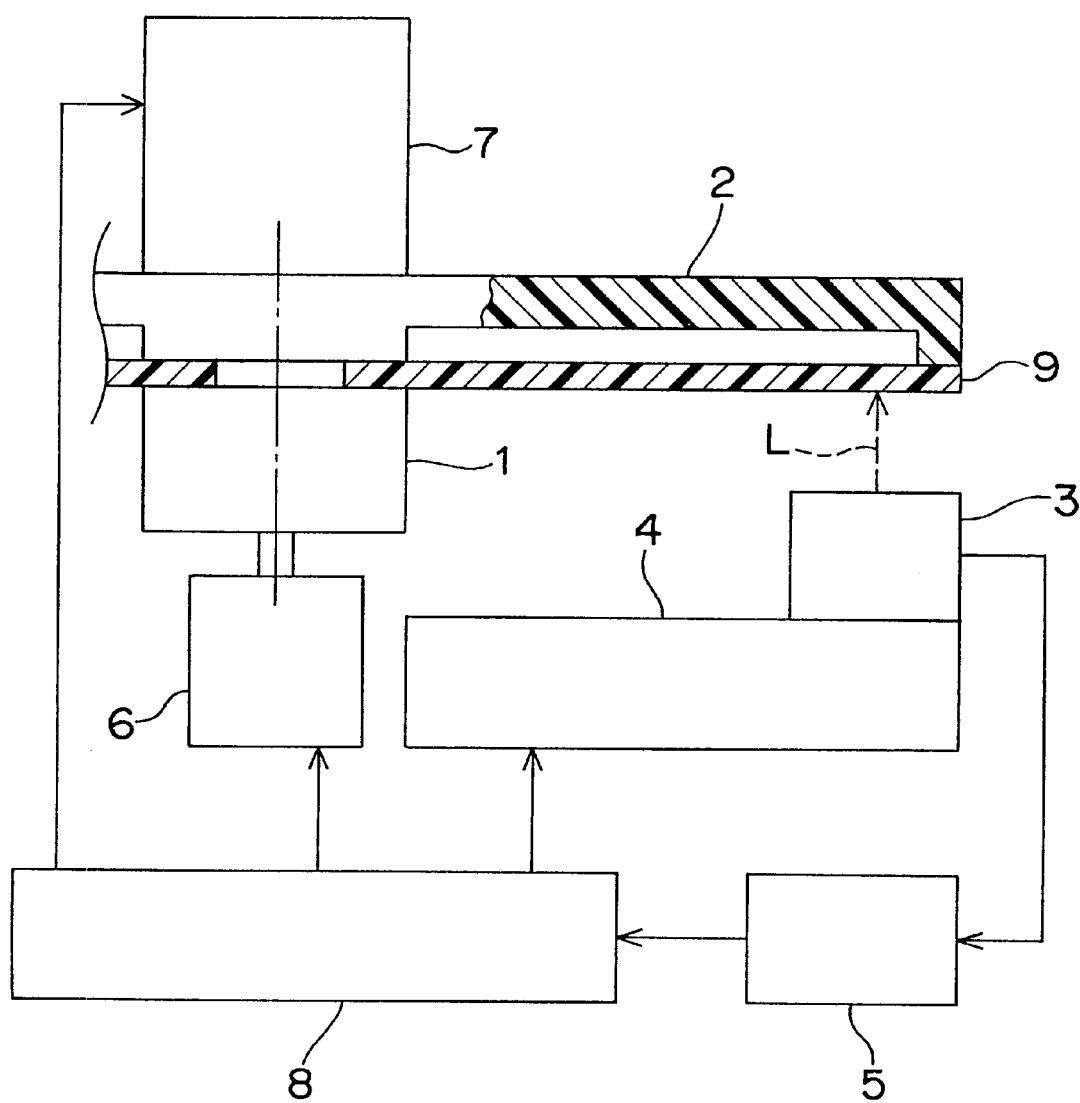
FIG. 4 is a block view of an arrangement of an optical disk driving device according to Embodiment 2 of the present invention.

Embodiment 2 of the optical disk driving device, which is an application of the above-described Embodiment 1, will now be explained with reference to the block structural view as illustrated in FIG. 4. In FIG. 4, the turntable 1, the clamper 2, and the pickup 3 are similar to those of the above-described Embodiment 1 so that the disk 9 is pinched and held by the turntable 1 and the clamper 2 and a light beam L is irradiated from the pickup 3. A pick controlling unit 4 for controlling the pickup 3 is to perform track directional movements (so-called track jumping) of the pickup, tracking and focus control. A pick reading unit 5 is for demodulating optical information of the disk 9 as detected by the pickup 3. A turntable rotating mechanism 6 (a spindle motor, for example) is for rotating the turntable 1 on the basis of instructions from a control unit 8 (to be described later) to thereby rotate the disk 9 that is pinched and held. A pressurizing unit 7 is capable of pressurizing the clamper 2 against the turntable 1 upon instructions of the control unit wherein its pressurizing force is variable while holding the clamper 2 in a freely rotating manner. The control unit 8 is for controlling the pick controlling unit 4, the turntable rotating mechanism 6, and the pressurizing unit 7. Particularly, the control unit 8 functions to input an output signal from the pick reading unit, to detect an amount of surface deflection of the disk 9 based on the signal, and to send an instruction to the pressurizing unit 7 for controlling the pressurizing amount in accordance therewith.

Figure 5:
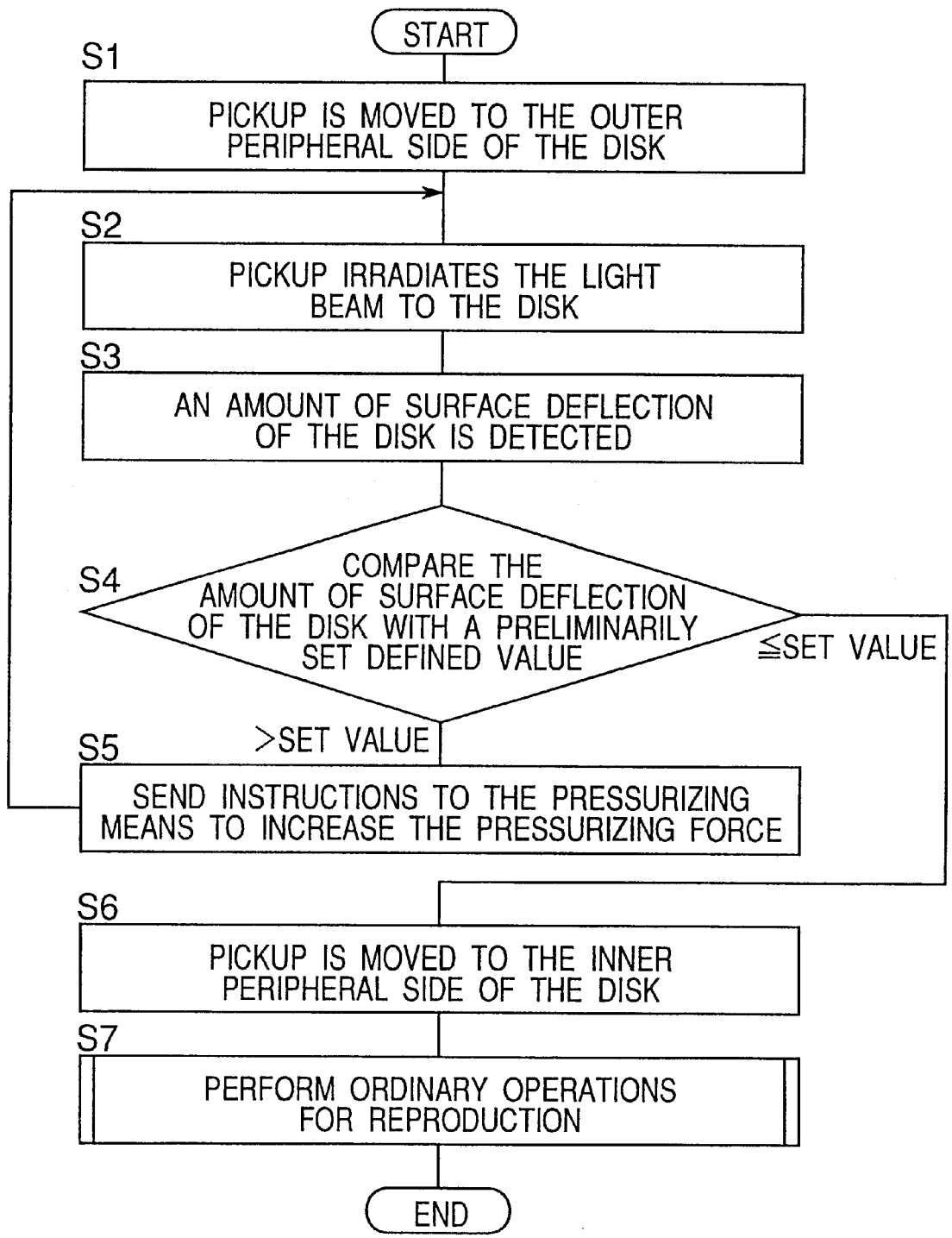
FIG. 5 is a flowchart for explaining operations of the optical disk driving device according to Embodiment 2 of the present invention.

Operations of the thus arranged optical disk driving device according to Embodiment 2 will now be explained hereinafter. FIG. 5 is a flowchart for illustrating operations thereof. In FIGS. 4 and 5, the disk 9 is first mounted on the turntable 1 and is pinched and held with the clamper 2 whereupon the control unit 8 sends instructions to the turntable rotating mechanism 6 to rotate the turntable 1. Then, before performing index data detection on the inner peripheral side (detection of TOC information of CDs or lead-in information of DVDs) as it is conventionally performed, the pickup 3 is moved to the outer peripheral side of the disk 9 by the pickup controlling unit 4 (step S1 in FIG. 5) for irradiating the light beam to the outer peripheral side (step S2 in FIG. 5). Upon input of the output signal of the pick reading unit 5 upon irradiation of the light beam to the outer peripheral side for detecting an amount of jitter thereof, the control unit 8 detects an amount of surface deflection of the disk 9 (step S3 in FIG. 5). Then, the control unit 8 compares this amount of surface deflection with a preliminarily set defined value (step S4 in FIG. 5), and, if it is determined that the amount is larger than the defined value, the control unit 8 sends instructions to the pressurizing unit 7 to increase the pressurizing force for further reducing the amount of surface deflection (step S5 in FIG. 5). When the amount of surface deflection becomes smaller, the control unit 8 sends instructions to the pick controlling unit to move the pickup to the inner peripheral side (step S6 In FIG. 5) for performing ordinary operations for reproduction (step S7 in FIG. 5).

It should be noted that the above embodiment has been explained based on a case in which the amount of surface deflection is detected from the jitter amount based on the output of the pickup 3. It is alternatively possible to detect this amount from a control signal when performing focus control of the pickup 3 through the pick control unit 4.

The pressurizing unit 7 may employ a method in which a screw is made to rotate at large torque through the rotation of a motor and a rotation transmitting mechanism such as gear trains for transmitting rotation and/or rotating force of the motor, wherein a rack on the clamper side is meshed with the screw for pressurizing and the pressurizing force is increased or reduced depending on the direction for rotating the motor. In another method, a permanent magnet is disposed on the rotatable clamper side while a stator coil serving as an electromagnet is disposed on the fixed device side, respectively, wherein the permanent magnet on the clamper side is moved for pressurizing by increasing or decreasing an amount of current supplied to the stator coil.

As explained so far, according to the present embodiment, it is possible to detect the warpage of a disk on the basis of its surface deflection during rotation to thereby increase or decrease thepressurizing force of the clamper, and thus to perform reproduction in a more stable manner.

Embodiment 3

Figure 6:
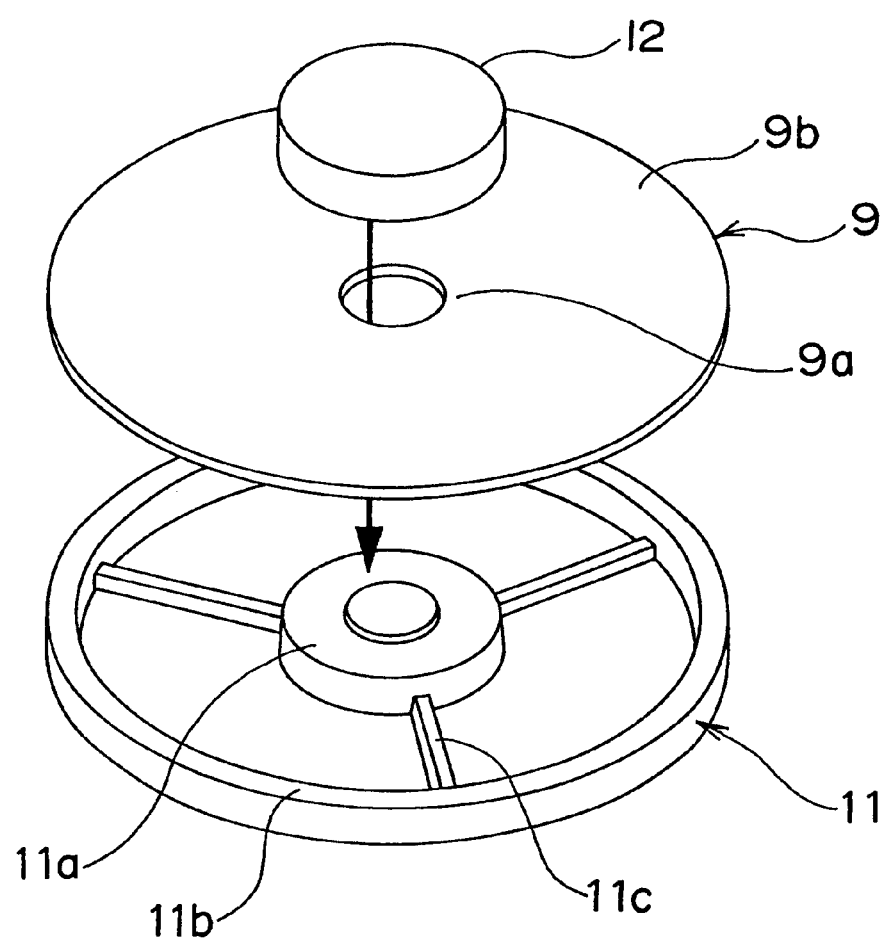
FIG. 6 is a perspective schematic view of an arrangement of an optical disk driving device according to Embodiment 3 of the present invention.
Figure 7A:
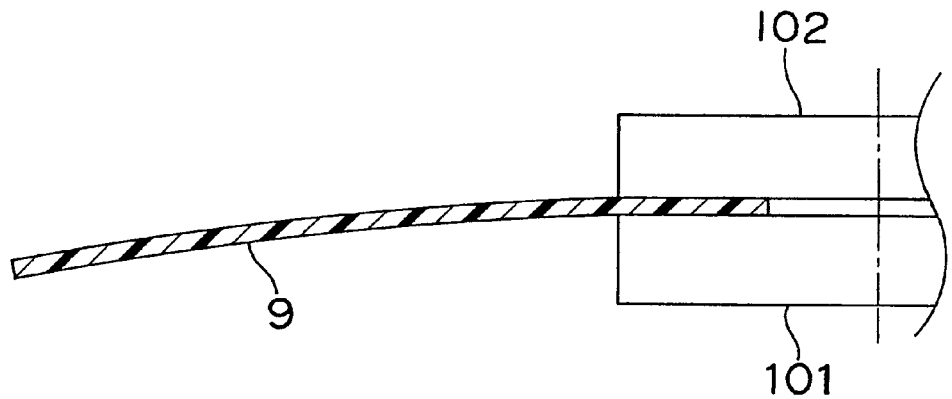
FIGS. 7A–7C are schematic side and sectional views for explaining operations of the optical disk driving device according to Embodiment 3 of the present invention.
Figure 7B:
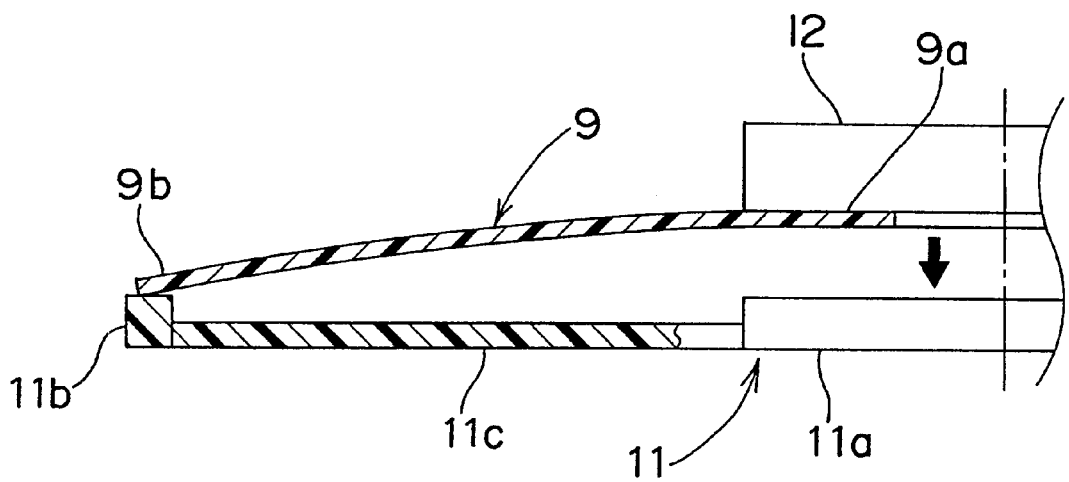

FIG. 6 is a perspective schematic view of an arrangement of an optical disk driving device according to Embodiment 3 of the present invention, and FIGS. 7A and 7B are schematic side and sectional views (wherein hatchings are omitted partially, similarly to FIG. 2). As shown in FIG. 6, a turntable 11 according to this embodiment is comprised of a central turntable portion 11a, an outer turntable portion 11b and a plurality of branch-like spokes 11c. The central turntable portion 11a has a radius similar to that of the turntable 1 as explained in Embodiment 1. The outer turntable portion 11b is similarly circular and concentric with the central turntable portion 11a. Also, the large table portion 11b has a radius that is substantially identical to an outer radius of a disk and further has a width of approximately 2 mm. The plurality of branch-like spokes 11c are arranged to extend from the central turntable portion 11a in a radial manner for supporting the outer turntable portion 11b. Respective disk mounting surfaces of the central turntable portion 11a and the outer turntable portion 11b are arranged to be of substantially identical height, and the spokes 11c are disposed in a retracted manner from these respective mounting surfaces. The numeral 12 denotes a clamper that is of substantially identical radius as that of the central turntable 11a as explained with reference to the prior art, and is for fixing the disk 9 by pinching and holding the same between the central turntable 11a and the clamper 12.

Operations of the thus arranged optical disk driving device will now be explained with reference to FIGS. 6, 7A and 7B. Similarly to the arrangement of Embodiment 1, the disk 9 is mounted on the turntable 11, and the clamper 12 is attached thereafter. At this time, the central turntable portion 11a of the turntable 11 pinches the proximity of the inner edge 9a of the disk 9 with the clamper 12 for fixing the same, and the outer turntable portion 11b contacts the outer edge 9b of the disk 9.

Figure 7C:
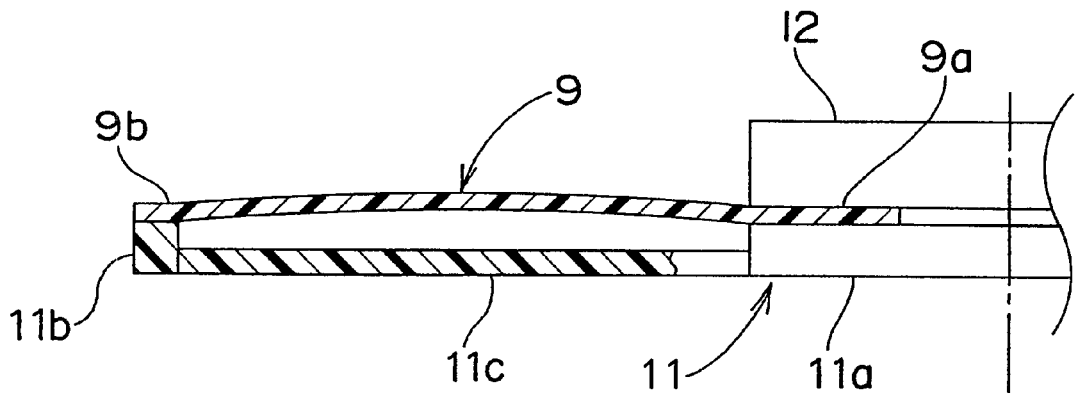

As illustrated in FIG. 7, in case the outer edge side of the disk 9 is warped towards a direction of a surface onto which the light beam is irradiated (in a direction opposite of a so-called labeled surface) (see FIG. 7A), the disk 9 is first made to abut against the outer turntable portion 11b of the turntable 11 at the outer peripheral portion 9b thereof as illustrated in FIG. 7B. Then, the disk 9 is pressurized by the clamper 12 for pinching and fixing the same with the central turntable 11a. With this pinching and holding, the warped outer edge portion 9b of the disk 9 is pressurized in a direction opposite to the original warpage so that the warpage is corrected. While it is generally the case that a middle radial portion of the disk 9c (that is, a portion between the proximity of the inner edge portion 9a and the proximity of the outer edge portion 9b) remains somewhat warped in the direction of the original warpage as illustrated in FIG. 7C. Even if the pressurizing causes a warpage in the opposite direction as shown in FIG. 7C, it will be the spokes 11c of the turntable 11 that oppose the central radial portion 9c, and the disk 9 will be prevented from contacting the spokes 11c of the turntable 11.

Though it may happen that no light beam is irradiated onto the disk 9 so that optical information may be not be detected through the presence of the spokes 11c, it is conventionally known that in case of reproducing CDs or DVDs, an error correcting function will come into force after detecting information of the disk by the pickup and demodulating the optical information into image, sound or digital information, and correction of partial lack of optical information will be performed. No problems will be caused even if the amount of disk surface that is covered by all of the plurality of spokes 11c corresponds to approximately ⅓ of its entire periphery at maximum.

Since the inner peripheral portion of the outer turntable portion 11b is arranged to be located outward of the outermost periphery of the information recording area of the disk 9, no lack of read information will caused by the outer turntable portion 11b that is arranged to extend over the entire periphery, and it will also not happen that important lead-in information (as known, this is a kind of retrieval information that is stored on the innermost periphery, similar to TOC information as stored on innermost peripheral tracks of CDs that are similarly important information) that are stored on the outermost peripheral track of DVD disks are covered thereby.

In this manner, even if warpage in the direction of a surface onto which the laser beam is irradiated is present in the disk 9, the warpage may be reduced by the turntable 11 comprising an outer turntable portion 11b, the angle between the light beam and the disk surface will fall within the above-described defined value, and accurate recording and reproduction can be performed also with a pickup that is not comprised with a tilt mechanism.

As explained so far, according to the present embodiment, it is possible to restrict warpage of a disk to be within a defined value by the provision of an outer turntable portion for correcting the warpage through pressurizing an outer periphery of the disk even if the disk is warped towards a surface onto which the light beam is irradiated to reduce an amount of surface deflection thereof, and thus to perform reproduction in a more stable manner.

Embodiment 4

Figure 8:
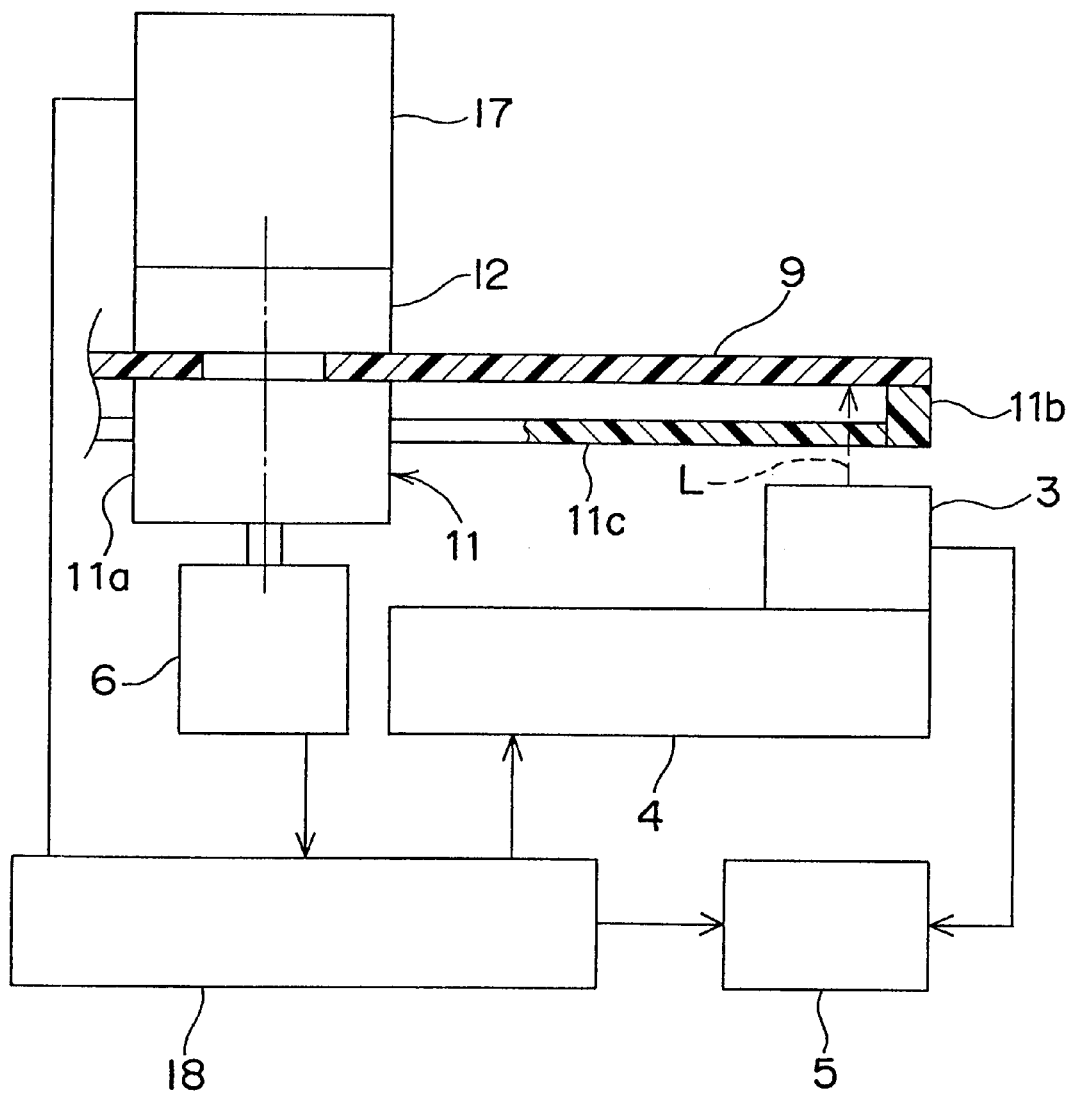
FIG. 8 is a block view of an arrangement of an optical disk driving device according to Embodiment 4 of the present invention.

Embodiment 4 of the optical disk driving device, which is an application of the above-described Embodiment 3, will now be explained with reference to the block structural view as illustrated in FIG. 8. In FIG. 8, the turntable 11, the clamper 12, and the pickup 3 are similar to those of the above-described Embodiment 3 so that the disk 9 is pinched and held by the turntable 11 and the clamper 12 and light beam L is irradiated from the pickup 3. A pick controlling unit 4 is for controlling the pickup 3 to perform track directional movements (so-called track jumping) of the pickup, tracking and focus control. A pick reading unit 5 is for demodulating optical information of the disk 9 as detected by the pickup 3. A turntable rotating mechanism 6 is for rotating the turntable 11 on the basis of instructions from a control unit 18 (to be described later) for rotating the disk 9 that is pinched and held. A pressurizing unit 17 is capable of pressurizing the clamper 12 against the turntable 11 while holding the clamper 12 in a freely rotating manner. A control unit 18 is for-controlling the pick controlling unit 4 and the turntable rotating mechanism 6, and is particularly arranged to perform positional control of the pick control unit 4 upon receipt of a rotational position signal that is output by the turntable rotating mechanism 6, to particularly send instructions to temporarily terminate focus control for maintaining the condition, and to temporarily stop operations of the pick reading unit 5.

Operations of the thus arranged optical disk driving device according to Embodiment 4 will now be explained. In the arrangement of FIG. 8, while the disk 9 is rotated by the rotation of the turntable 11, the focus control of the pickup 3 will be disturbed each time the spokes 11c of the turntable 11 intercept the light beam L. However, since rotational phases of the spokes 11c can be obtained from rotational position signals for indicating rotational positions of the turntable as output from the turntable rotating mechanism 6 for rotating the turntable 11, the control unit 18 sends instructions to the pick controlling unit 4 to release focus control and to maintain an immediately preceding focus position on the basis of rotational phases of the spokes 11c during a period preceding and following intersection of the light beam L by the spokes 11c. The pick reading unit 5 is further controlled to ignore outputs from the pickup while the spokes 11c are intersecting the light beam L.

As explained so far, according to the present embodiment, it is possible to exhibit the effect of correcting warpage by the outer turntable portion even if the disk is warped towards the direction of the surface onto which the light beam is irradiated, and of enabling stable focus control by coping with interruptions of the light beam through spokes for supporting the outer turntable portion by detecting rotational phases of the turntable.

It should be noted that while the clamper 2 has been described in Embodiment 1 as comprising an outer clamper portion 2b for coping with disks that are warped in a direction of a labeled surface, and the turntable 11 has been described in Embodiment 3 as comprising an outer turntable portion 11b for coping with disks that are warped in a direction of a surface onto which the light beam is irradiated, it is of course possible to use both in combination. In such an instance, even if both of the outer turntable portion and the outer clamper portion are arranged to project further than the respective central turntable portion and the central clamper portion, the amount of projection will be absorbed by the deflection of the spokes of the turntable and the force for pinching and holding the disk through the central turntable portion and the central clamper portion will not become loose. It is similarly possible to combine Embodiment 2 with Embodiment 4.

While the surface onto which the light beam is irradiated is mounted on the turntable and the light beam is irradiated from a direction in which the turntable is located in both of the embodiments, it is possible to achieve similar effects even in an arrangement in which a surface opposite to the surface onto which the light beam is irradiated (so-called labeled surface) is mounted on the turntable to be pinched and held by the clamper from above whereupon the light beam is irradiated from a direction in which the clamper is located, wherein the arrangement shall be opposite to that of the above-described embodiments in that the clamper is comprised with a central clamper portion, an outer clamper portion, and spokes for supporting the outer clamper portion. By further employing an arrangement, as is the case with two-sided reproducing-type DVDs, with which it is possible to utilize disks onto which light beams are irradiated from both directions, wherein the turntable for mounting the disk thereon and rotating as well as the clamper for pinching and holding the disk are supported through respective spokes for supporting their outer turntable portion and outer clamper portion, respectively, it is possible to irradiate light beams from both sides without reversing the two-sided disk for reproduction.

Since the outer periphery of the disk is pressurized over the entire periphery to reduce warpage in both of the embodiments, the device is effective not only for reproducing disks including a single warpage on its disk surface but also disks having outer peripheries that are waved.

It is known that there are devices in which disks such as CDs having a diameter of 12 cm (hereinafter referred to as "12 cm CDs") and those having a diameter of 8 cm (hereinafter referred to as "8 cm CDs") may be driven (that is, reproduced) in the same device. According to the present embodiment that is made to correspond to 12 cm CDs, it is possible to perform driving without any problems and to drive both types of disks in the same device since ordinary driving may be performed in the presence of less influence of warpage owing to the small diameter of 8 cm CDs and since outer peripheral portions of 8 cm CDs, when mounted, will oppose the concave portion 2c of the clamper 2 or the spokes 11c of the turntable 11 when being mounted.

It is possible to provide a soft member such as felt or rubber on the clamper or the turntable that abut the disks. It is particularly the case with disk-like recording medium driving devices including speakers such as so-called CD radio-cassette players that influences of air vibration transmitted from the speakers on the disks can be reduced by increasing the clamper or the turntable in size up to the diameter of the disks, that resonance frequencies thereof may be decreased, and that larger air vibrations are permissible, so that it is also possible to provide speakers of larger output.

While materials for both of the clampers and the turntables have not been explained in each of the embodiments, these members shall be made of synthetic resin or metal such as aluminum, brass or stainless steel. It is particularly the case that extraneous emission of switching noise, which is due to a pickup that is located downward of a pinched disk or a traverse mechanism for moving the pickup in a radial direction, may be restricted when the clamper that is provided upward of the disk is made of metal. While three spokes have been provided for the turntable in the example as illustrated in Embodiment 3, the invention is not limited to this number, and it is also possible to use four or five spokes so long as the problem of the disk area being covered by the spokes is accounted for. It should of course be understood that oscillation is caused during high-speed rotation unless the spokes are disposed at substantially identical angles.

While it is generally the case that the turntable is rotated through a direct drive type brushless motor in a known manner, the present invention is not limited to this arrangement, and it is alternatively possible to employ a driving force transmitting mechanism such as a belt, a timing belt or a gear, or to provide rotation through an ordinary brushed direct-current motor.

As explained so far, the present invention is capable of exhibiting superior effects of correcting warpage of a warped disk-like recording medium by abutting and pressurizing against a proximity of an outer periphery thereof on which no information is recorded, of restricting an angle formed between an information recording surface of the disk and a light beam that is irradiated for recording and reproducing information to be within a specified value, and of precisely reading information for accurately recording and reproducing the same.

Embodiment 5

Embodiment 5 of the optical disk driving device will now be explained with reference to FIGS. 9A, 9B and 9C. In an arrangement of these figures, the turntable 21 and the clamper 22 are similar to those of the above-described Embodiment 1 (refer to FIGS. 1,2 and 3) so that the disk 9 is pinched and held by the turntable 21 and the clamper 22.

Clamper moving operations for moving the clamper 22 in a direction away from an upper surface of the turntable 21 unless the turntable 21 and the clamper 22 are in pinching and holding conditions will now be explained with reference to FIGS. 9A, 9B and 9C that are schematic side and sectional views. The disk 9 that has been moved onto the turntable 21 by a tray 23 is mounted by the clamper 22. A protrusion 23a formed on the tray is provided for introducing the disk 9 to a position that is concentric with the turntable 21, and the protrusion 23a may be a hindrance to movement of the tray.

Figure 9A:
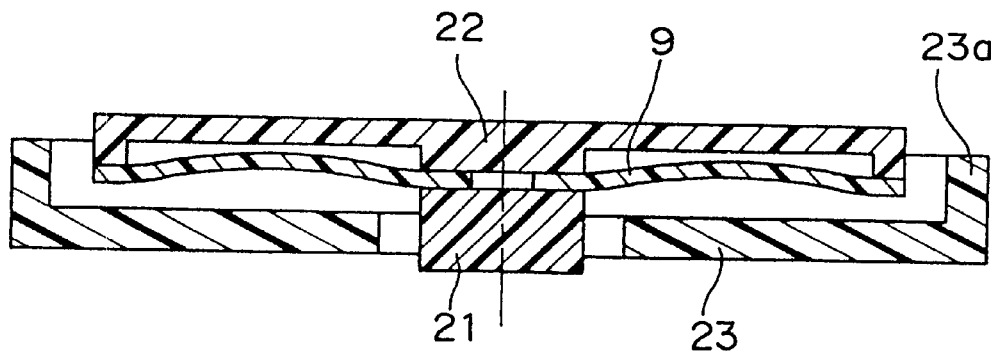
FIGS. 9A–9C are schematic side and sectional views for explaining operations of an optical disk driving device according to Embodiment 5 of the present invention.
Figure 9B:
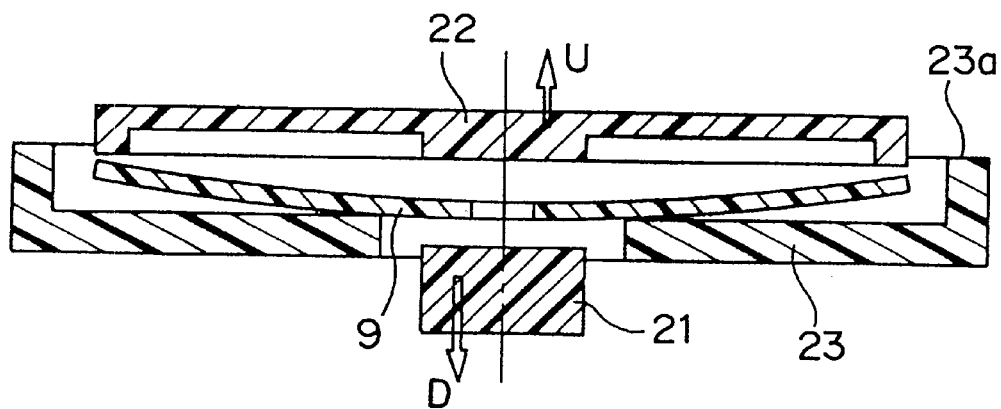
Figure 9C:
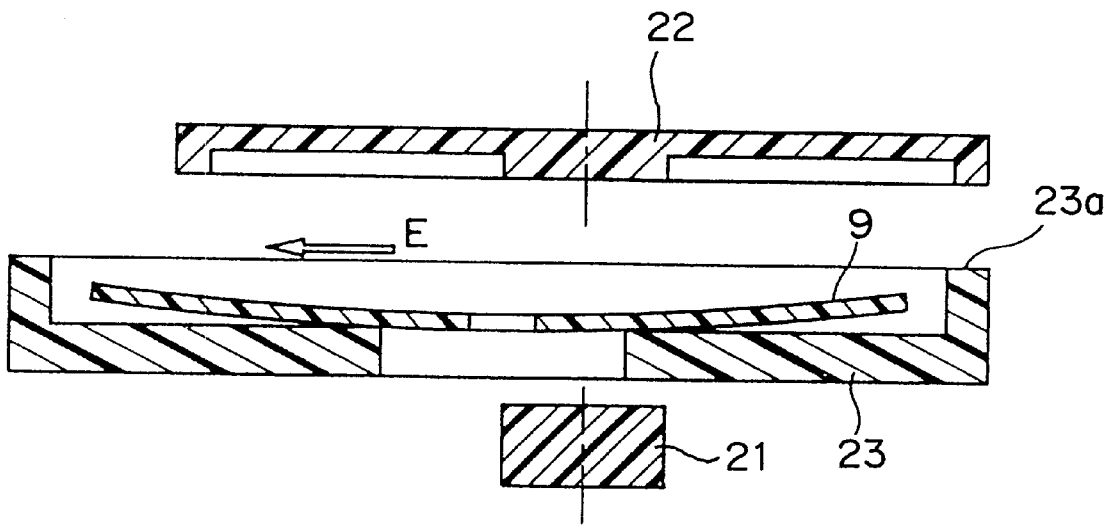

FIG. 9A illustrates a condition in which the disk 9 is pinched and held by the clamper 22 and the turntable 21 (similar to FIG. 2C). It can be understood that the disk 9 is pinched and held in a condition in which it is remote from the tray 23. Simultaneously with the movement of the turntable 21 in a direction as indicated by arrow D as illustrated in FIG. 9B, which is a direction away from the disk 9, the clamper 22 will move in a direction away from the upper surface of the turntable (direction as indicated by arrow U in the drawing). Owing to the movement of the clamper 22, it is possible to avoid a case in which movements of the tray 23 are hindered by the protrusion 23a of the tray or any other hindrances when the tray moves (in a direction as indicated by arrow E in FIG. 9C).

As explained so far, the provision of a clamper for pressurizing an outer periphery of the disk from its labeled surface will reduce warpage of the disk to enable stable driving for reproduction and also avoid hindrances preventing movements of the tray.

Embodiment 6

Figure 10:
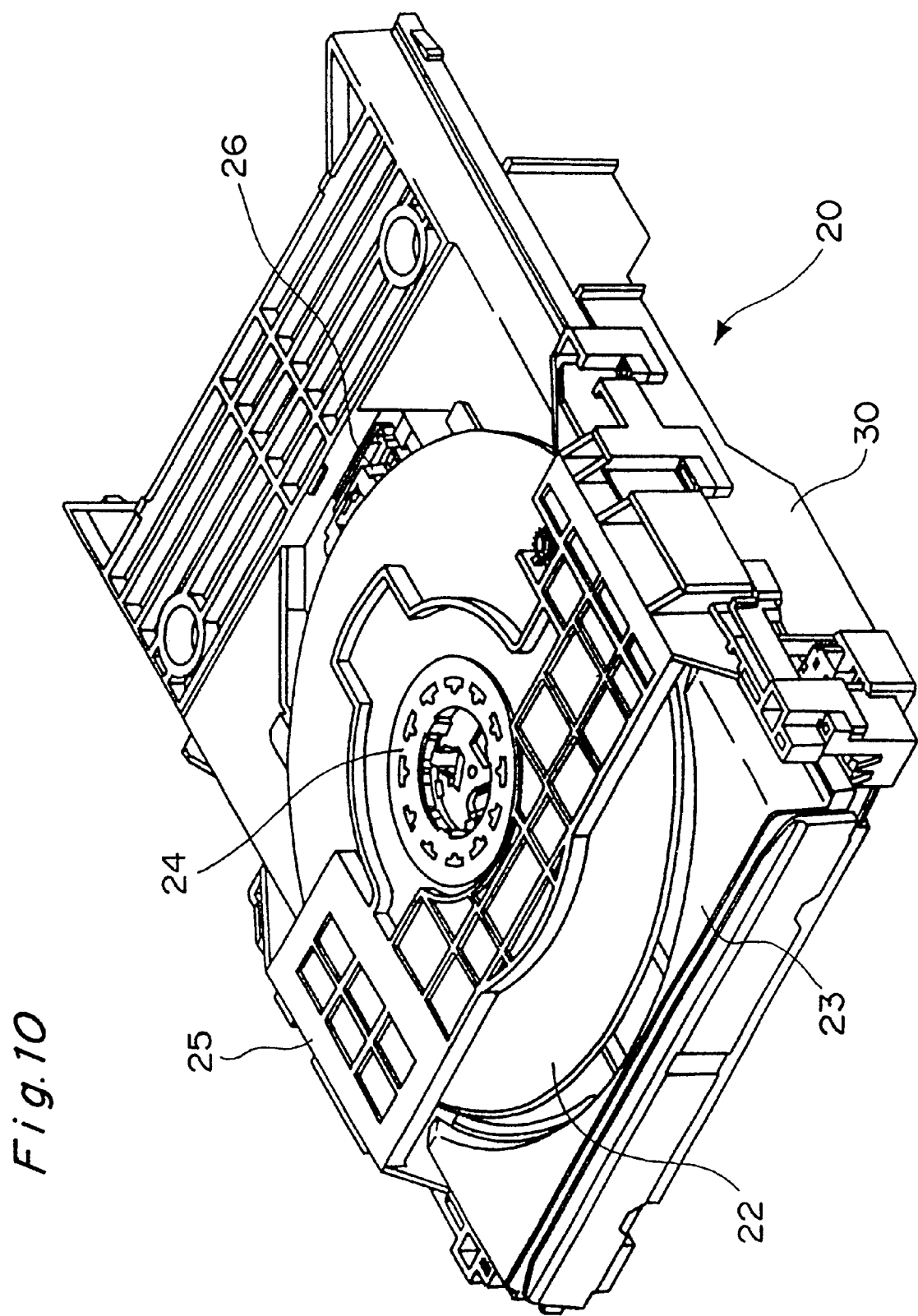
FIG. 10 is an overall perspective view of the optical disk driving device according to Embodiment 6 of the present invention.
Figure 11:
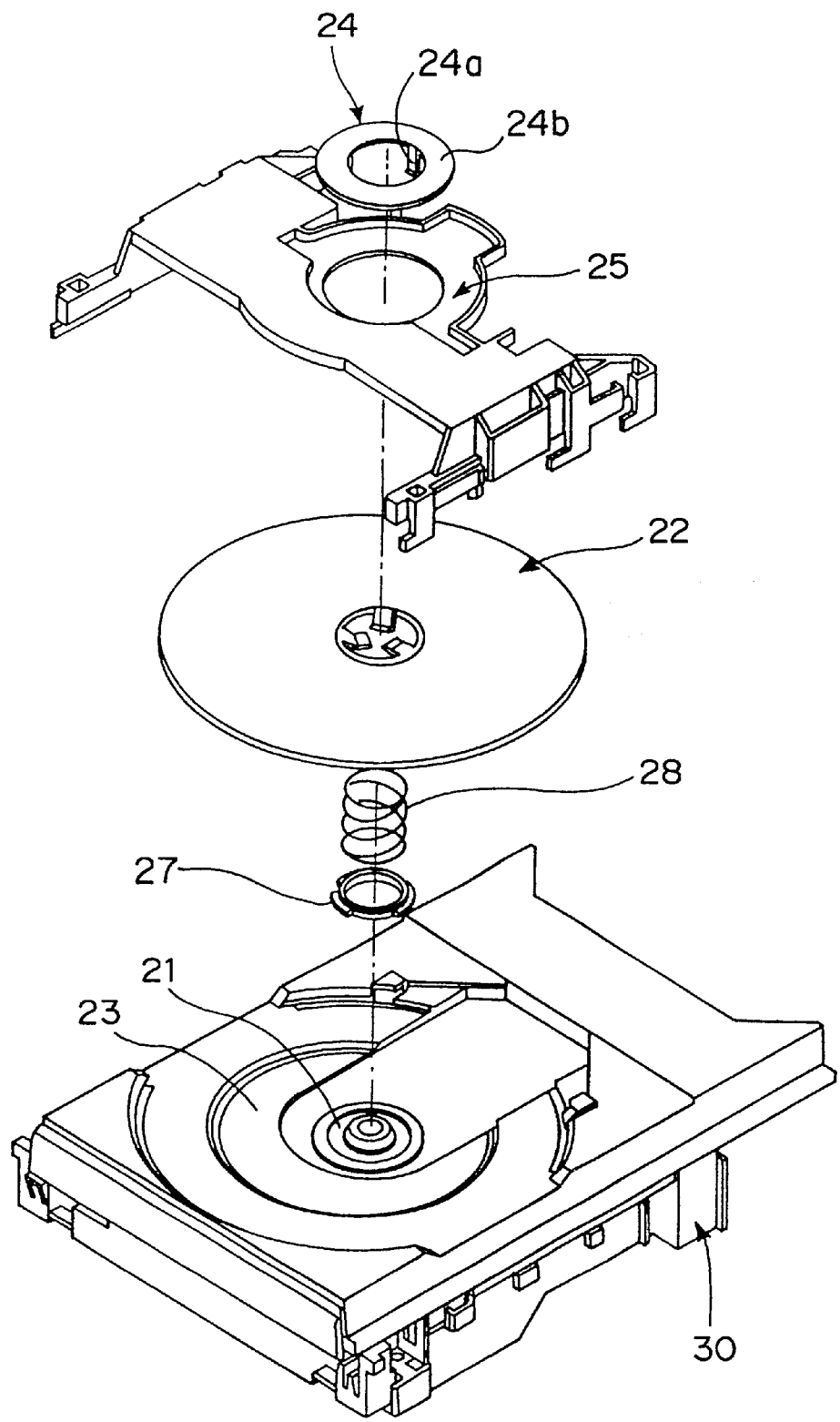
FIG. 11 is an exploded perspective view of the optical disk driving device according to Embodiment 6 of the present invention.
Figure 12A:
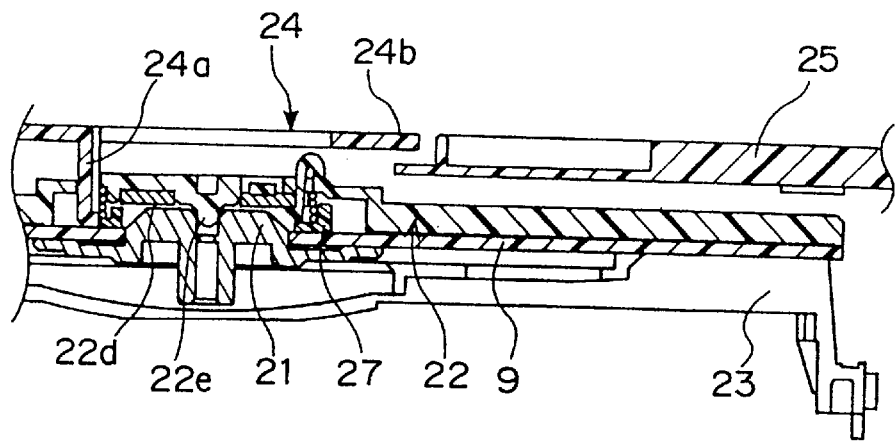
FIGS. 12A–12C are schematic side and sectional views for explaining operations of the optical disk driving device according to Embodiment 6 of the present invention.
Figure 12B:
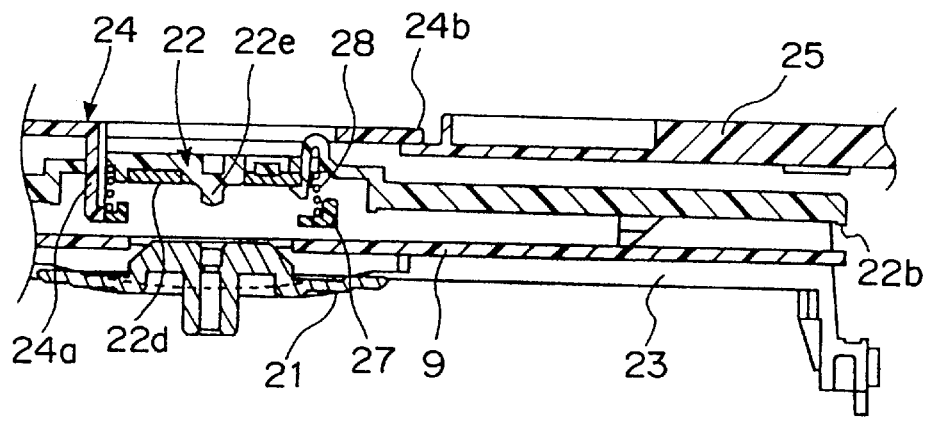
Figure 12C:
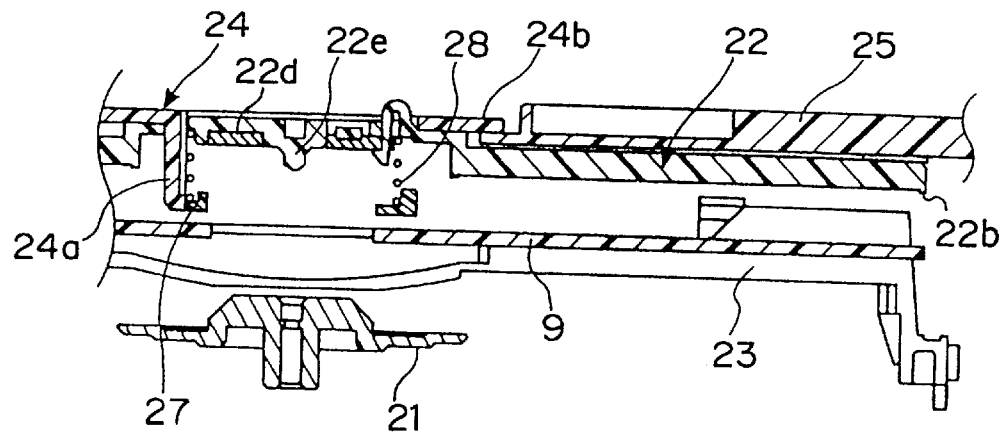

Embodiment 6 of the optical disk driving device, which is an application of the above-described Embodiment 5, will now be explained in detail with reference to FIGS. 10 to 12C. FIG. 10 is an overall perspective view of the optical disk driving device 20 according to the present invention, and FIG. 11 is an exploded perspective view thereof. FIGS. 12A–12C are partial sectional side views for explaining operations thereof, illustrating a condition in which the disk is being pinched and held (FIG. 12A) up to a condition immediately before starting moving through the tray (FIG.

12C). Since the turntable 21 and the tray 23 are similar to those of the above-described Embodiment 5, detailed explanations thereof will be omitted here.

In FIGS. 10 to 12C, a clamper magnet 22d is arranged downward of the proximity of the inner radius of the clamper 22 to oppose a tip end of the turntable that is made of a ferromagnetic material such as iron. A tapered center portion 22e is provided in the center of the clamper 22 for achieving centering of the turntable 21 and the clamper 22 by being inserted into a central hole of the turntable 21. It should be noted that centering of the disk 9 and the turntable 21 is achieved in a conventional manner in that the inner radial portion of the disk 9 is held by a tapered stepped portion of the turntable 21.

A spring hook 24 with a hook portion 24a projecting from its inner radial portion is arranged in the center of a clamp plate 25. The hook portion 24a pierces through a clamp plate 25 in a freely rotating and moving-with-play arrangement Also, the hook portion 24a pierces through the clamper 22 under the clamp plate 25 and engages the spring hook 24 with the clamper 22 through a spring member 28. With this arrangement, the clamper 22 abutting against the disk and pressurizing the same will be urged by the spring member 28 in an upward direction above the spring hook 24 engaged at the inner radial hook portion 24a.

In this manner, the clamper 22, the spring member 28, a spring holder 27, and the clamp plate 25 supporting the spring hook 24 will be fixed to a main body of the clamping device (mechanic base) 30 for holding the turntable 21 and for mounting the tray 23 thereon in a freely sliding manner. The numeral 26 (refer to FIG. 10)denotes an optical pickup unit.

Operations of the thus arranged optical disk driving device according to Embodiment 6 will now be explained. In FIGS. 12A, 12B and 12C, FIG. 12A illustrates a condition in which the disk 9 mounted on the lifted turntable 21 is being fixed by being pinched and held by the clamper 22, similarly to a condition as illustrated in the above-described Embodiment 1. Since magnetic attractive force generated between the clamper magnet 22d of the clamper inner radial portion and the turntable 21 is larger than the upwardly directed urging force generated by the spring member 28, the clamper 22 pressurizes the disk 9 that is mounted on the turntable 21 over its entire surface. Moreover, since the turntable 21 is lifted, the spring holder 27 and the hook portion 24a are also lifted with the proximity of the inner radius of the disk being pinched between so that the spring hook 24 is remote from the clamp plate 25 to allow free rotation.

Next, by the downward movement of the turntable 21 in a direction away from the disk 9 (direction D in the drawing) as illustrated in FIG. 12B, the disk 9 is separated from the turntable 1 and mounted onto the tray 23. The spring holder 27 and the hook 24 that are now remote from the turntable 21 and are no longer supported thereby will be suspended through magnetic attractive force between the clamper magnet 22d and the turntable 21 as well as their own weights, while a rim portion 24b provided on an upper portion of the spring hook 24 will engage at the clamp plate 25 so that the spring holder 27 and the spring hook 24 will be supported by the clamp plate 25. Furthermore, upon descending of the turntable 21, the magnetic attractive force between the separated turntable 21 and the clamper magnet 22d will be reduced such that repulsive force of the spring member 28 overcomes this force, and the clamper 22 will be urged in the upward direction to thereby separate the clamper 22 from the disk 9 located on the tray 23.

As illustrated in FIG. 12C, after the turntable 21 moves in a direction to be further separated from the disk 9 and the clamper 22 and the tray 23 as well as the tray 23 and the turntable 21 are sufficiently separated, the tray 23 will move in a sliding manner in a forward direction (vertical direction with respect to the sheet of paper on which the drawing is illustrated) with the disk 9 remaining mounted thereon to eject the disk 9.

When mounting the disk 9 on the turntable 21 by performing the above-described operations in an opposite order, the tray 23 similarly moves in a sliding manner in a condition in which it is sufficiently remote from the clamper 22 and the turntable 21 as illustrated in FIG. 12C. When the disk 9 is moved to the proper position above the turntable 21, the sliding movement of the tray 23 is terminated and the turntable 21 is lifted. Accompanying the lifting of the turntable 21, the spring hook 24 will be lifted with the proximity of the inner radial portion of the disk being pinched between to thereby disengage the spring hook 24 and the clamp plate 25. When the magnetic attractive force between the turntable 21 and the clamper magnet 22d overcomes the upwardly directed urging force of the spring member 28, the clamper 22 will be attracted in a downward direction for pressurizing the disk 9.

In the above-described embodiment, the magnetic attractive force between the clamper 22 and the turntable 21 and the force of the spring member 28 are directed in opposite directions when pinching and holding the disk 9 so that the magnetic attractive force needs to be larger than the spring force.

As explained so far, according to the present embodiment, though the optical disk driving device is comprised with a clamper of large diameter, the employment of the spring member enables the clamper 22 of large diameter for pressurizing the disk when approaching the turntable automatically to separate from the disk when the turntable is descending so that movements of the tray 23 are prevented from being hindered by the projection 23a or other hindrances when the tray performs sliding movements for ejecting the disk.

Embodiment 7

Figure 13A:
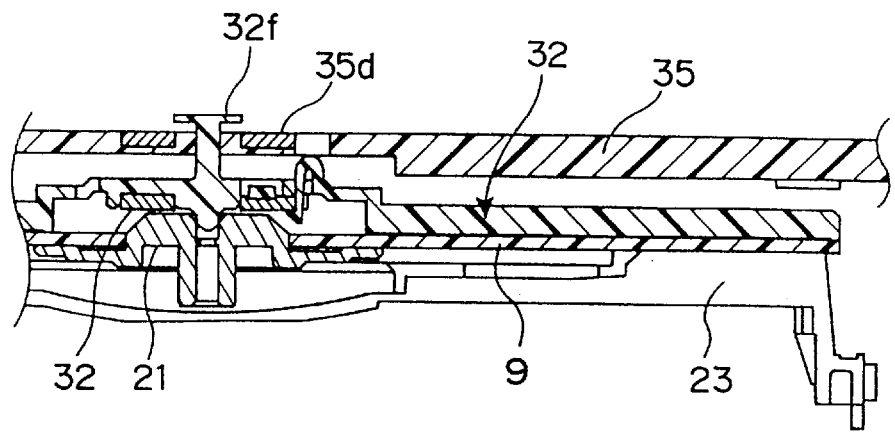
FIGS. 13A–13C are schematic side and sectional views for explaining operations of an optical disk driving device according to Embodiment 7 of the present invention.
Figure 13B:
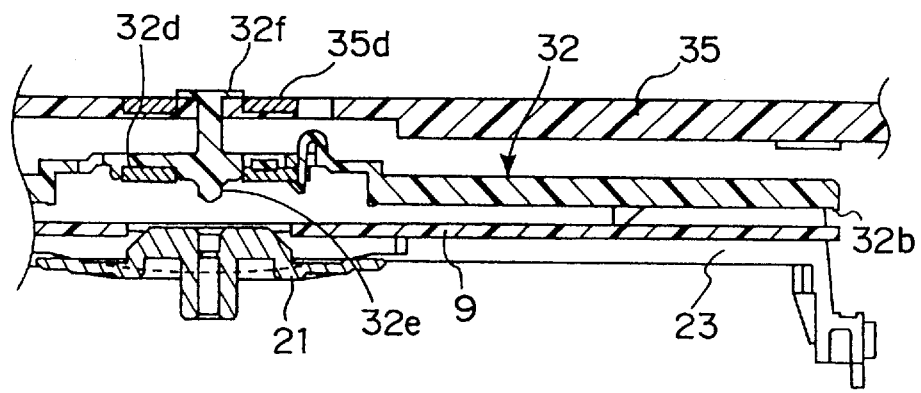
Figure 13C:
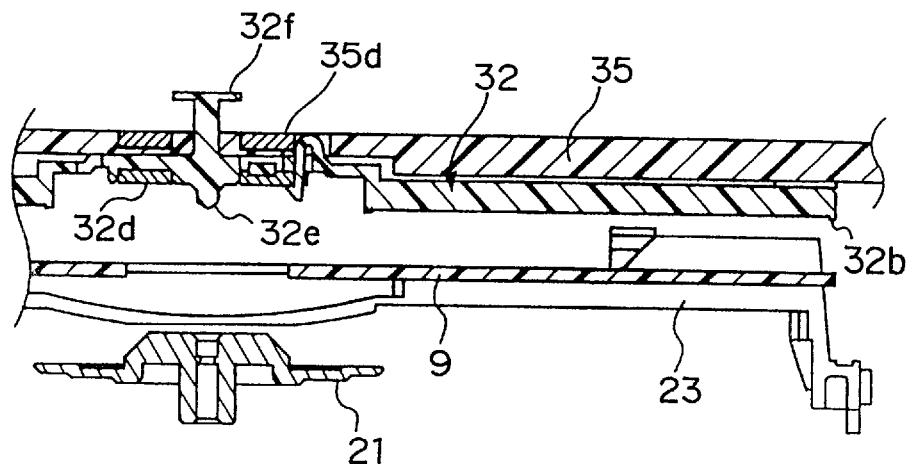
Figure 14:
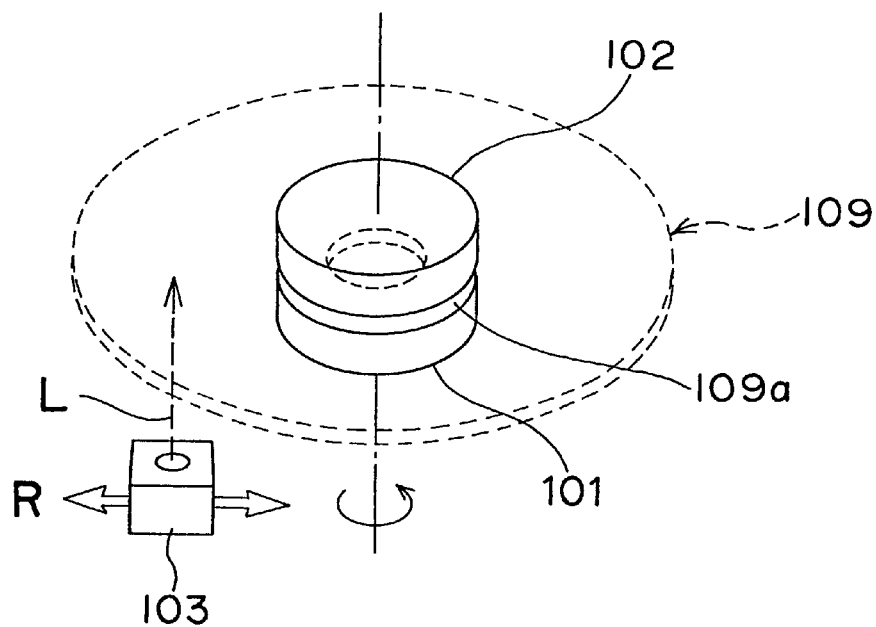
FIG. 14 is a schematic view of an arrangement of a conventional optical disk driving device.
Figure 15:
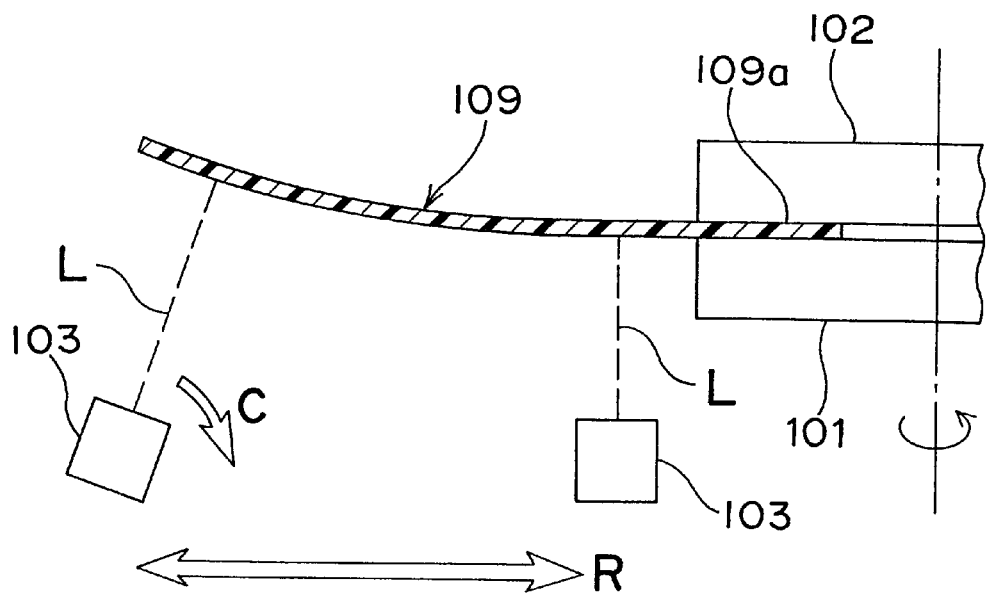
FIG. 15 is a schematic plan view of the above device on which a warped disk is mounted.

Embodiment 7 of the optical disk driving device, which is an application of the above-described Embodiment 5, will now be explained in detail with reference to FIGS. 13A, 13B and 13C. FIGS. 13 A, B and C are partial sectional side views for explaining operations of an optical disk driving device according to Embodiment 7 of the present invention. In FIGS. 13 A, 13B and 13C, the turntable 21 and the tray 23 are similar to those of the above-described Embodiment 5. As for the clamper 32, the arrangement for pressurizing the entire surface of the disk is identical to that of the above described arrangement except that this arrangement does not maintain a spring member and retraction of the tray at the time of sliding movements is performed through attraction provided through magnetic force between the clamper and the clamp plate 35 that is held with play. More particularly, a second magnet 35d is provided on the clamp plate 35, and the turntable 21, a first magnet 32d and the second magnet 35d are arranged to be aligned on a substantially concentric axis such that the first magnet 32d of the clamper 32 is attracted by the turntable 21 or the second magnet 35d.

Operations of the thus arranged optical disk driving device according to Embodiment 7 will now be explained with reference to FIGS. 13A, 13B and 13C. In FIG. 13A, the disk 9 that is mounted on the turntable 21 is fixed, as illustrated in the above-described Embodiment 5, by being pinched and held by the clamper 32 that is attracted by the turntable 21 as described above. The turntable 21 then moves in a direction in which it separates from the clamp plate 35 (downward direction in the drawing) to mount the disk 9 on the tray 23. Upon movement of the turntable 21 and the disk 9, the clamper 32, which is engaged at brim portion 32f, will be supported by the clamp plate 35 with play (FIG. 13B) through attractive force with the turntable or through its own weight as explained with reference to the prior art When the turntable 21 further moves upward and the magnetic attractive force of the first magnet 32d with the turntable 21 is overcome by the magnetic attractive force with the second magnet 35d, the clamper 32 is lifted through mutually pulling magnetic force between the first magnet and the second magnet (FIG. 13C).

It should be noted that not both of the first magnet and the second magnet need to be comprised by magnets, and either one may be a metal member. However, as explained with reference to the prior art, such an arrangement will be realized when magnets and metal members are adjoining in the turntable 21, the first magnet, and the second magnet, since magnetic force is also utilized for pinching and holding through the clamper and the turntable.

The magnetic attractive force between the turntable and the first magnet needs to be larger than the pulling force between the first magnet and the second magnet in order to pinch and hold the disk.

As explained so far, according to the present invention, it is possible to achieve the advantageous effects of correcting warpage by abutting and pressurizing a proximity of an outer periphery of a disk-like recording medium (an optical disk) at which no information is recorded, of restricting an angle between an information recording surface of the disk and the light beam that is irradiated for recording and reproducing information to be within a specified value, and of precisely reading information for accurately performing recording and reproduction. By the provision of a mechanism for moving the clamper of large diameter for abutting and pressuring an outer periphery of the disk, it is possible to achieve the effect of enabling unhinderd movements of the tray.

What is claimed is:

1. An optical disk driving device for pinching and holding an optical disk that is mounted on a rotatably driveable turntable, said optical disk driving device comprising a clamper supported in a freely rotatable manner for rotation about a rotation axis, said clamper including
   a central clamper portion for pinching and holding a proximity of an inner edge of the optical disk with the turntable, said central clamper portion having an outer periphery that completely surrounds said rotation axis, and
   an outer clamper portion for abutting against an outer periphery of the optical disk.

2. The optical disk driving device as claimed in claim 1, further comprising
   a pressurizing unit for pressing said clamper against the turntable;
   a surface deflection amount detecting unit for detecting an amount of surface deflection of the optical disk when the optical disk is mounted on the turntable, and
   a control unit for sending instructions to the pressurizing unit to increase pressing force depending on the detected results of the amount of surface deflection obtained by the surface deflection amount detecting unit.

3. The optical disk driving device as claimed in claim 1, wherein
   said central clamper portion is fixed in position with respect to said outer clamper portion so that said central clamper portion is non-movable with respect to said outer clamper portion.

4. An optical disk driving device for pinching and holding an optical disk, which is mounted in a position so as to be concentric with a turntable fixed to a rotating axis of a spindle motor, said optical disk driving device comprising:
   a clamper supported in a freely rotatable manner for rotation about a rotation axis, said clamper comprising a central clamper portion for pinching and holding a proximity of an inner edge of the optical disk with the turntable, said central clamper portion having an outer periphery that completely surrounds said rotation axis, and an outer clamper portion for abutting against an outer periphery of the optical disk; and
   a clamper moving mechanism for moving said clamper in a direction opposite to an upper surface of the turntable unless the turntable and said clamper are in pinching and holding conditions.

5. The optical disk driving device as claimed in claim 4, further comprising
   the turntable, wherein said turntable is concentric with said clamper;
   a spring holder mounted in a position concentric with said clamper;
   a spring member, interposed between said clamper and said spring holder, having one end abutting said clamper and the other end abutting said spring holder;
   a spring hook piercing through said clamper and fixed to said spring holder with said clamper and said spring member being interposed between said spring hook and said spring holder; and
   a clamp plate for supporting said spring hook;
   wherein said spring hook is supported by said clamp plate unless said turntable and said clamper are in pinching and holding conditions, and wherein said clamper is urged to move by said spring member.

6. The optical disk driving device as claimed in claim 4, further comprising
   a first magnet mounted on said clamper;
   a clamp plate disposed on a side of said clamper arranged to be opposite the turntable;
   a second magnet mounted on said clamp plate; and
   wherein said clamper is movable through mutual attraction due to magnetic force of said first magnet and said second magnet unless said clamper is in a pinching and holding condition with the turntable.

7. An optical disk driving device for pinching and holding an optical disk that is mounted on a rotatably driveable turntable, said optical disk driving device comprising a clamper supported in a freely rotatable manner for rotation about a rotation axis, said clamper including
   a central clamper portion for pinching and holding a proximity of an inner edge of the optical disk with the turntable, and
   an outer clamper portion for abutting against an outer periphery of the optical disk,
   wherein said central clamper portion is fixed in position with respect to said outer clamper portion so that said central clamper portion is non-movable with respect to said outer clamper portion.

8. The optical disk driving device as claimed in claim 7, further comprising
- a pressurizing unit for pressing said clamper against the turntable;
- a surface deflection amount detecting unit for detecting an amount of surface deflection of the optical disk when the optical disk is mounted on the turntable, and
- a control unit for sending instructions to the pressurizing unit to increase pressing force depending on the detected results of the amount of surface deflection obtained by the surface deflection amount detecting unit.

9. An optical disk driving device for pinching an optical disk that is mounted on a rotatably driveable turntable with a clamper that is supported in a freely rotatable manner, wherein the turntable of the optical disk driving device comprises
- a central turntable portion for pinching and holding a proximity of an inner edge of the optical disk with the clamper,
- an outer turntable portion abutting against an outer periphery of the optical disk, and
- spokes for supporting the outer turntable portion from the central turntable portion.

10. The optical disk driving device as claimed in claim 9, further comprising
- a pickup for irradiating light beams onto the optical disk,
- a pickup controlling unit for controlling the pickup,
- a turntable rotating mechanism for controlling rotation of the turntable and outputting a rotational position signal for indicating a position of rotation, and
- a control unit for sending instructions to the pickup controlling unit to interrupt focus control of the pickup depending on a rotational phase upon input of the rotational position signal of the turntable.

11. An optical disk driving device for pinching and holding an optical disk that is mounted on a rotatably driveable turntable, said optical disk driving device comprising:
- a clamper supported in a freely rotatable manner, said clamper including a central clamper portion for pinching and holding a proximity of an inner edge of the optical disk with the turntable, and an outer clamper portion for abutting against an outer periphery of the optical disk;
- a pressurizing unit for pressing the clamper against the turntable;
- a surface deflection amount detecting unit for detecting an amount of surface deflection of the optical disk when the optical disk is mounted on the turntable; and
- a control unit for sending instructions to the pressurizing unit to increase pressing force depending on the detected results of the amount of surface deflection obtained by the surface deflection amount detecting unit.

12. An optical disk driving device for pinching and holding an optical disk, said optical disk driving device comprising:
- a turntable fixed to a rotating axis of a spindle motor and arranged to have the optical disk concentrically mounted thereon;
- a clamper supported in a freely rotatable manner in a position concentric with said turntable, said clamper comprising a central clamper portion for pinching and holding a proximity of an inner edge of the optical disk with said turntable, and an outer clamper portion for abutting against an outer periphery of the optical disk;
- a clamper moving mechanism for moving said clamper in a direction opposite to an upper surface of said turntable unless said turntable and said clamper are in pinching and holding conditions;
- a spring holder mounted in a position concentric with said clamper;
- a spring member, interposed between said clamper and said spring holder, having one end abutting said clamper and the other end abutting said spring holder;
- a spring hook piercing through said clamper and fixed to said spring holder with said clamper and said spring member being interposed between said spring hook and said spring holder; and
- a clamp plate for supporting said spring hook;
- wherein said spring hook is supported by said clamp plate unless said turntable and said clamper are in pinching and holding conditions, and wherein said clamper is urged to move by said spring member.

13. The optical disk driving device as claimed in claim 12, wherein
- a first magnet is mounted on said clamper;
- a clamp plate is disposed on a side of said clamper opposite said turntable;
- a second magnet is mounted on said clamp plate; and
- said clamper is movable through mutual attraction due to magnetic force of said first magnet and said second magnet unless said turntable and said clamper are in pinching and holding conditions.

* * * * *